(12) United States Patent
Murtha

(10) Patent No.: US 6,619,282 B1
(45) Date of Patent: Sep. 16, 2003

(54) SOLAR CONCENTRATING LIQUID LIGHTGUIDE

(76) Inventor: R. Michael Murtha, 1010 Janetwood Dr., Oxnard, CA (US) 93030

( * ) Notice: Subject to any disclaimer, the term of this patent is extended or adjusted under 35 U.S.C. 154(b) by 0 days.

(21) Appl. No.: 10/147,801

(22) Filed: May 16, 2002

(51) Int. Cl.[7] ............................ F24J 2/32; F24J 2/44; F24J 2/46
(52) U.S. Cl. ............... 126/636; 126/639; 126/648; 126/650
(58) Field of Search ................ 126/636, 639, 126/648, 650, 713

(56) References Cited

U.S. PATENT DOCUMENTS

| | | | |
|---|---|---|---|
| 2,680,437 A | * 6/1954 | Miller | 126/649 |
| 3,563,305 A | * 2/1971 | Hay | 165/49 |
| 3,886,998 A | * 6/1975 | Rowekamp | 165/49 |
| 4,237,965 A | * 12/1980 | Hay | 165/48.2 |
| 4,262,659 A | * 4/1981 | Brzezinski | 126/667 |
| 4,790,293 A | * 12/1988 | Caines | 126/564 |
| 6,021,007 A | * 2/2000 | Murtha | 359/834 |

FOREIGN PATENT DOCUMENTS

| | | | |
|---|---|---|---|
| EP | 0 076 875 | * | 4/1983 |
| JP | 358039355 | * | 4/1983 |

* cited by examiner

*Primary Examiner*—Alfred Basichas

(57) ABSTRACT

This nontracking solar concentrator can be larger than a football field and produce a 20 sun focus. A tank holds panels to collect light and water to guide light to the focus. The tank has a wide field of view that eliminates the need for a sun-tracking mechanism.

4 Claims, 3 Drawing Sheets

Ｕ Ｓ 6,619,282 Ｂ 1

SOLAR CONCENTRATING LIQUID LIGHTGUIDE

FIELD OF THE INVENTION

This invention relates to the collection of sunlight, specifically to a large area solar concentrating collector.

DESCRIPTION OF THE PRIOR ART

In U.S. Pat. No, 6,021,007 (Murtha), I disclose a new kind of solar concentrating collector that is able to produce high temperatures without tracking the sun. The glass optic has a wide field of view that eliminates the need for a sun-tracking mechanism. However, due to the expense of the glass, the collector area must be kept small.

SUMMARY OF THE INVENTION

The primary object of this invention is to replace the expensive glass of the prior art with water. Water allows the present invention to become a nontracking solar concentrator with a large and inexpensive collection area.

Accordingly, the primary object is accomplished in the following manner: A low-profile tank with an open top is filled with clear water to guide light. Optical panels are placed in the water standing upright in parallel rows. Each panel collects sunlight and all of the panels add to the intensity of the light as it is guided through the water to a focus at one end of the tank. In the focus, a receiver absorbs the concentrated light producing a temperature rise in a volume of working fluid. Since the collector is made mostly of water, the tank can be scaled-up to any size and maintain the same concentration ratio. In this way, an economy of scale is achieved for the first time in a monolithic solar concentrating collector.

Another object is to take advantage of the fact that water absorbs about half of the sunlight that it intercepts, becoming heated in the process. Specifically, the body of water that guides the light is being heated by the light and will be used as feedwater in the focus, thus ensuring a good collection efficiency.

Another object is to increase the field of view of this nontracking solar concentrator, thereby extending the useful collection time available throughout the year.

Other objects and advantages of this invention will become apparent from the following detailed description and accompanying drawings.

DRAWING FIGURES

DESCRIPTION OF THE PREFERRED EMBODIMENTS

The words "lightguide" and "collector" are used interchangeably throughout the specification.

Figure 1A:
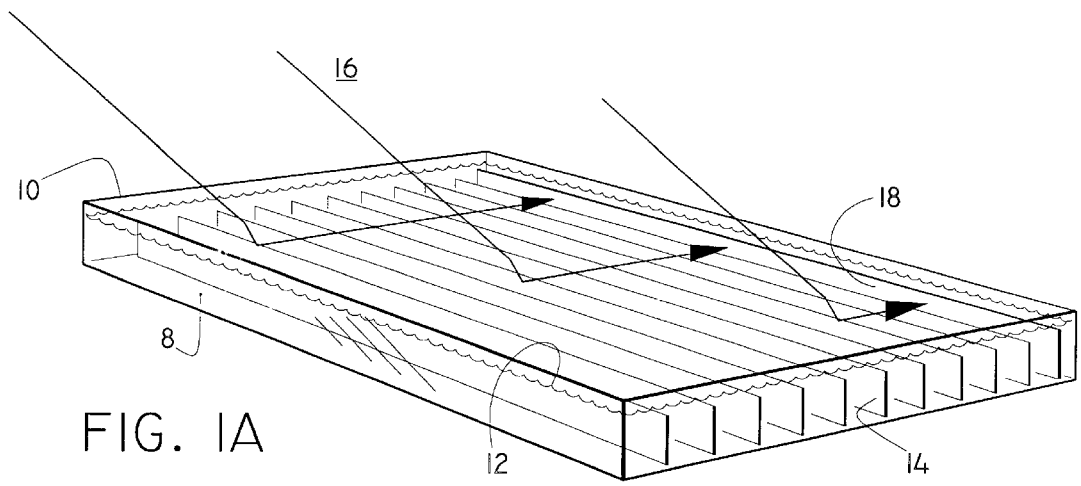
FIG. 1A is a perspective view of a lightguide having parallel top and bottom surfaces.

Turning now to FIG. 1A there is shown a solar concentrating lightguide in which a low profile tank having a glass bottom 8 and four glass walls 10 is filled with water 12. Directional panels 14 are oriented east to west, standing upright and parallel in the water. Incoming sunlight 16 is collected by all of the directional panels and guided to receiver 18 at one end of the tank. The geometric concentration ratio (collection area divided by receiver area) for this figure is about 10:1. Since the nontracking collector is made mostly of water, the tank can be scaled-up to the area of a football field, keep the same concentration ratio, and deliver a proportionately larger volume of hot water.

Figure 1B:
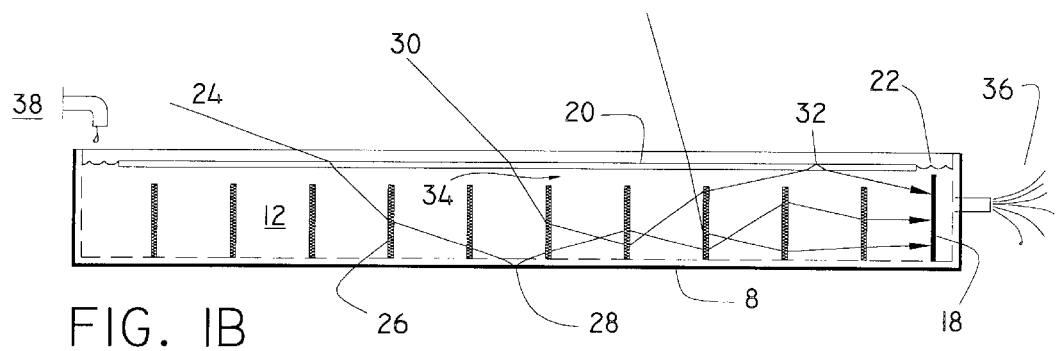
FIG. 1B is an end view of the lightguide in FIG. 1A.

FIG. 1B is an end view of the same collector. The entire lightguide is bathed in sunlight, but individual rays will traced for a better understanding. Starting at the top, a clear plastic sheet 20 floats on the water surface to smooth water ripples 22 and improve light guidance. Incident ray 24 refracts into clear sheet 20 according to Snell's law and continues into water 12 toward directional panel 26. Ray 24 refracts into the panel, is collected into the plane of the lightguide, totally internally reflects 28 at tank bottom 8, then propagates through the series of other panels until it impacts receiver 18. Incident ray 30 enters the lightguide, is collected and totally internally reflected 32 at floating sheet 20, passing a number of panels on its way to the receiver.

About half of all the collected light reaches the receiver. The other half (mostly infrared) is absorbed by the water raising the water temperature. This energy is not lost because the warm water is urged by gravity to flow 34 over the panels toward the focus as preheated feedwater for the receiver. The water temperature is raised a final time at the receiver with the concentrated light. Hot water 36 then leaves the collector to perform work and is replaced by cold water 38 supplied at the upstream end of the tank.

Figure 1C:
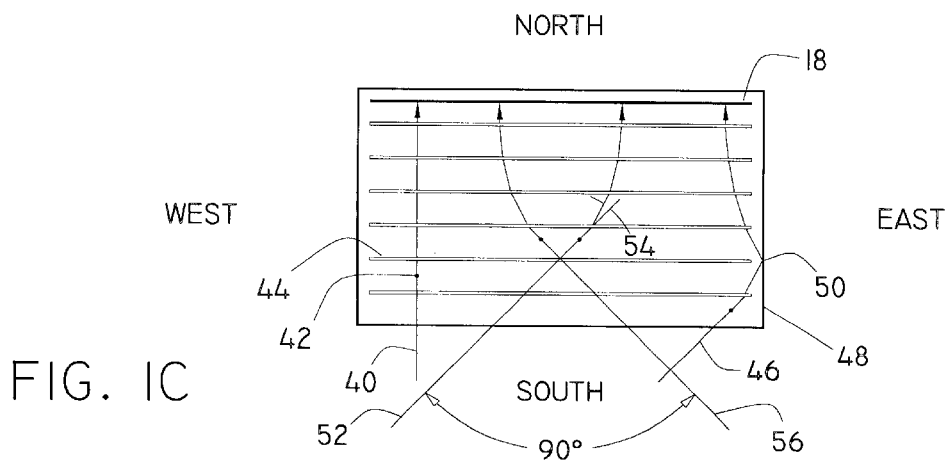
FIG. 1C is a plan view of the lightguide in FIG. 1A.

FIG. 1C is a simplified plan view of the same nontracking collector, shown in the northern hemisphere. Ray 40 enters the lightguide at point 42, is collected by panel 44 and takes a straight path to receiver 18. Ray 46 is collected and approaches clear tank wall 48 at greater than the critical angle, totally internally reflects 50 and begins to incrementally turn with each succeeding panel toward the receiver. First 45° ray 52 enters the lightguide, is collected and turned by small increments 54 toward the receiver with each succeeding panel, while second 45° ray 56 follows the same sequence. Rays 52 and 56 define the 90° azimuth acceptance angle that this collector with plane parallel top and bottom surfaces can produce. The full altitude/azimuth field of view of 75°/90° delivers up to 6 hours (9 am to 3 pm) of solar collection and concentration.

Figure 2:
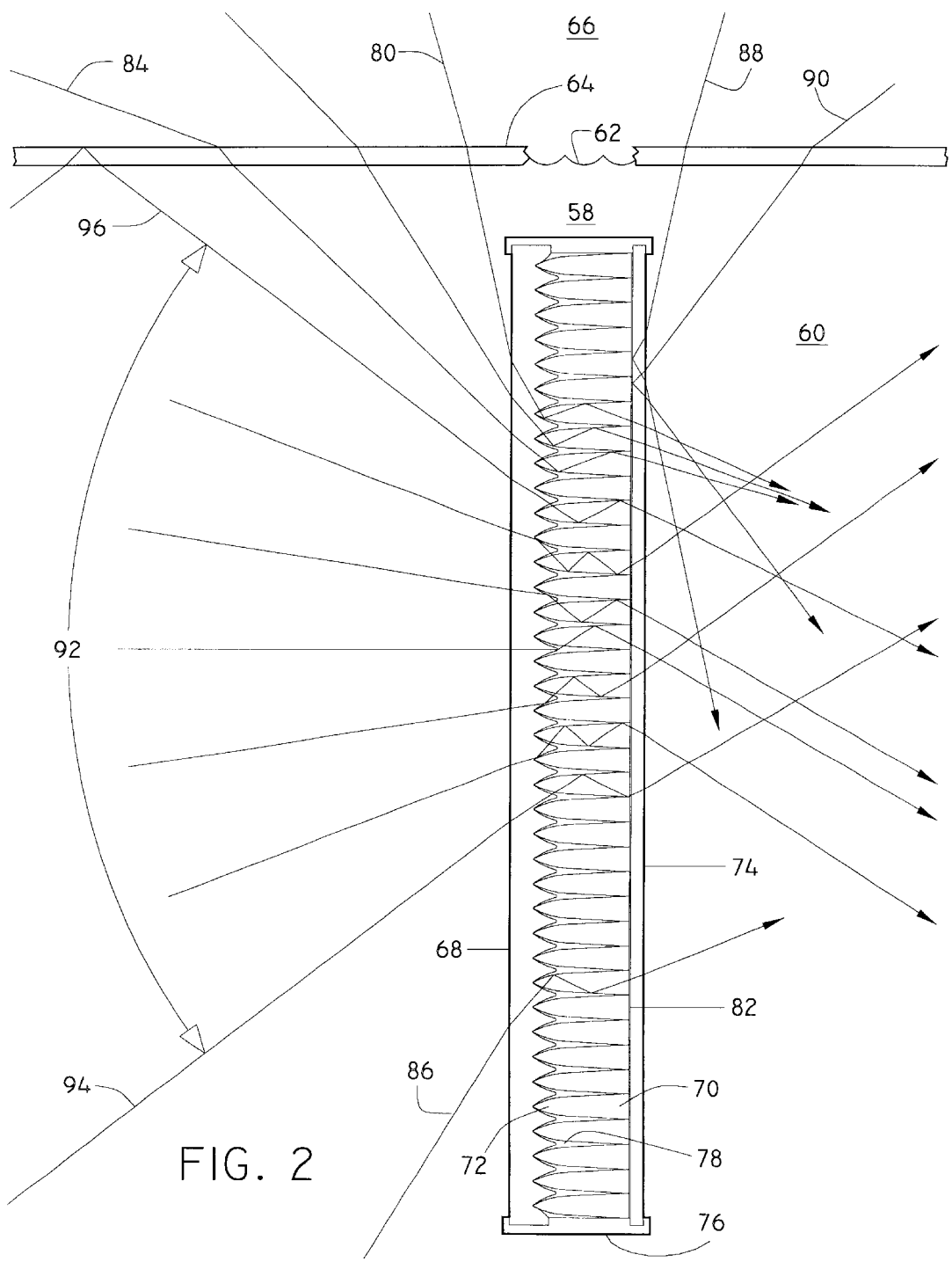
FIG. 2 is an end view of a directional panel optic.

FIG. 2 is the east end view of a typical directional panel 58 submerged in water 60. The panel is oriented perpendicular to water surface 62. Clear plastic sheet 64 floats on the water making the surface smooth and insulating the water from outside air 66. Directional panel 58 is an assembly of long transparent glass or plastic components. Corrugated plate 68 is flat on one side and formed with linear "peak and valley" corrugations on the opposite side. Wedge 70 has an ogive tip 72 that fits into a valley of the corrugated plate. Tip 72 has a 180° field of view that collects all incident light and turns it toward the receiver. Wedge 70 widens at the opposite end allowing light to exit more directly into a guided range of rays. A vertical array of identical wedges is held in position by backing plate 74. Frame 76 holds the assembly together and keeps water from intruding into air gaps 78 that exist between the wedges. Panel 58 simultaneously collects and guides light.

Light is collected by the first side of the panel. High angle ray 80 is incident upon and transmits through plastic sheet 64 into water 60. The ray then impinges the smooth outer surface of corrugated plate 68, refracting into it. Ray 80 exits the corrugated side of the plate into a wedge, is totally internally reflected several times before exiting the wedge, crosses air gap 82 and transmits through the backing plate and into water 60. Ray 80 has now been collected into a guided range of rays. Low angle ray 84 follows the same path sequence, as do the intermediate rays. Since directional panel 58 has a 180° field of view, it can also collect light 86 reflected off the bottom of the tank into the guided range of rays.

Light is also collected by the second side of the panel. Highest angle ray 88 is incident upon floating sheet 64, transmits into water 60 and impinges backing plate 74. The ray then refracts into the backing plate and approaches the opposite surface at greater than the critical angle, totally internally reflects at air gap 82 and refracts out of the plate into the water. Lowest angle ray 90 follows the same path sequence, as do all intermediate rays. Rays 88 and 90 are not yet fully collected. It will be shown that a tilted bottom mirror will bring these rays into the guided range of rays.

A guided range of rays 92 will now transmit through panels identical to 58 on the way to the receiver. For example, ascending guided ray 94 refracts into and then exits corrugated plate 68. The ray then enters a wedge, is totally internally reflected several times before exiting, crosses air gap 82 and transmits through backing plate 74 to reenter the guided range. Descending guided ray 96 follows the same path sequence, as do all the other rays in the guided range.

Directional panel 58 provides this concentrator with a wide field of view that eliminates the need for a sun-tracking mechanism. The concentrator is always "on". Additionally, the wide field of view collects diffuse sunlight as well as direct sunlight.

MANUFACTURING

No new technology is needed to build the tank or the directional panels. An above-ground swimming pool could serve as a model for the shallow tank. The tank walls can be tempered glass or polycarbonate plastic and must be kept clean on the outside surface to perform total internal reflection of the guided light. The directional panel components are simple shapes that can be mass produced as pressed glass or injection molded plastic. Compared to the well known single axis-tracking parabolic trough, this nontracking concentrator has relaxed manufacturing tolerances.

THE RECEIVER

For photothermal applications the receiver can be a metal pipe or plate, blackened for good light absorption and emission. Another candidate is a wall-like heat exchanger that uses a separate working fluid. From a different perspective, the water itself can be the only "receiver" since the water can be brackish to the point where it will absorb all the collected, guided and concentrated light.

The photovoltaic application requires that the collector tank be filled with demineralized water for good light transmission. The receiver will be an array of silicon solar cells in the form of a wall. If waterproof, the photovoltaic array would be submerged in the focus. If not waterproof, the array would be optically coupled to the outside of the glass tank wall. Either way, the array can be cooled by the nearby mass of water. Additionally, the water will act as an infrared absorption filter for the photovoltaic array, transmitting only those shorter wavelengths that can be converted to electricity.

OTHER COLLECTOR SHAPES

Figure 3:
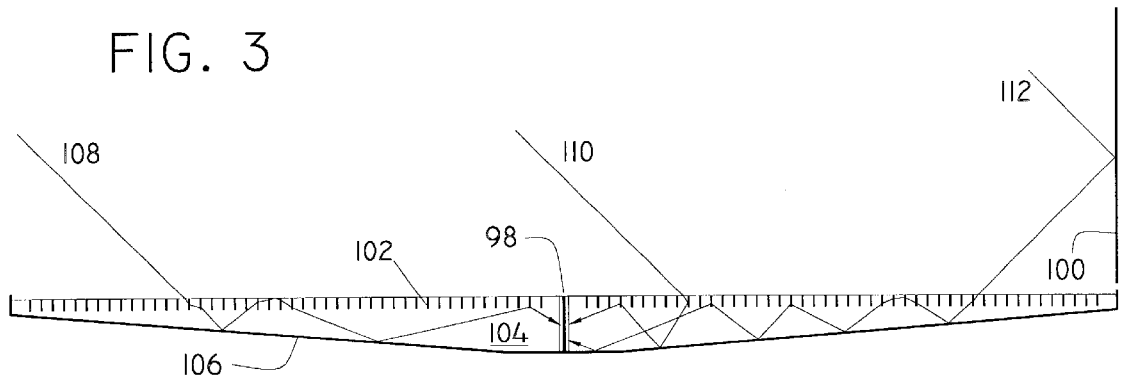
FIG. 3 is an end view of a lightguide having nonparallel top and bottom surfaces.

FIG. 3 is the east end view of a different version of the present invention. Identical lightguides, which have been turned to face each other, collect and deliver a 25:1 geometric concentration ratio to central receiver 98 (ten suns from the left, ten from the right and five from a booster mirror, at noon). Directional panels 102 are oriented east to west and submerged in water 104. The panels extend only part way down to the tank bottom, allowing a clear path to the receiver for some of the guided light. Tank bottom 106 is a metalized mirror having a tilt angle that is responsible for this collector's 120° field of view. Ray 108 enters the water, is collected by a directional panel, reflects off the tank bottom and passes through a series of inner panels on its way to the receiver. Ray 110 is collected by a directional panel's backing plate and reflects off the tilted bottom mirror into the guided range of rays. Ray 112 reflects off booster mirror 100, is collected by a directional panel's corrugated plate and propagates similarly toward receiver 98. The full altitude/azimuth field of view of 80°/120° delivers up to 8 hours (8 am to 4 pm) of solar concentration.

Figure 4A:
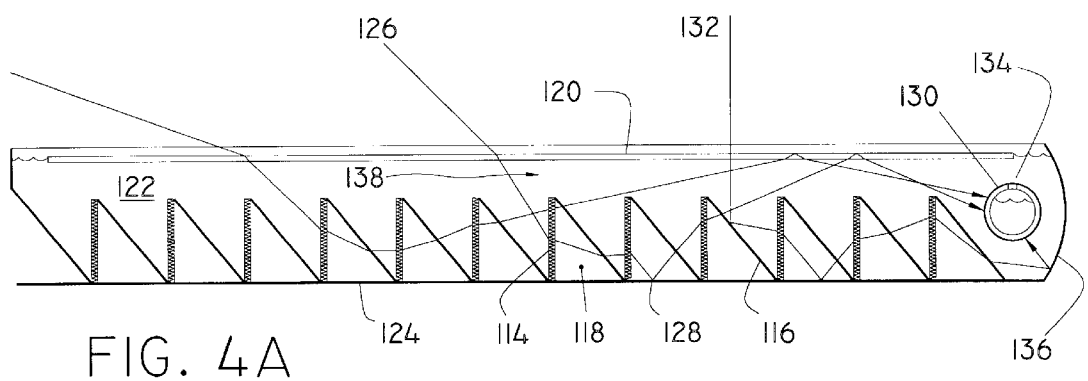
FIG. 4A is an end view of a lightguide having a sawtooth bottom.

FIG. 4A is the east end view of another preferred embodiment. The collector has a watertight sawtooth bottom made of directional panels 114 (like FIG. 2), and diagonal glass walls 116, separated by air passages 118. Diagonal glass walls 116 are directly responsible for this collector's 180° azimuth field of view. Plastic sheet 120 floats on water 122 while a reflective film 124 lays flat beneath the tank. Ray 126 refracts into the lightguide, is collected by directional panel 114, passes into air space 118, refracts inwardly at a diagonal glass wall and through the next inner panel into an air space, and reflects 128 off film 124 on its way to receiver 130. Ray 132 is collected by total internal reflection at diagonal glass wall 116, follows a path sequence much like the other rays, and reflects off curved end mirror 136 onto receiver 130. Receiver 130 is a submerged pipe having inlet holes 134 along the top edge to take in the infrared heated water 138 that flows toward it. Once inside the pipe, that preheated water is elevated to a higher temperature by the concentrated light that shines upon the pipe. Since the collector can be scaled to any size, the pipe can be from 1" to 48" in diameter and maintain the same 10:1 geometric concentration ratio.

Figure 4B:
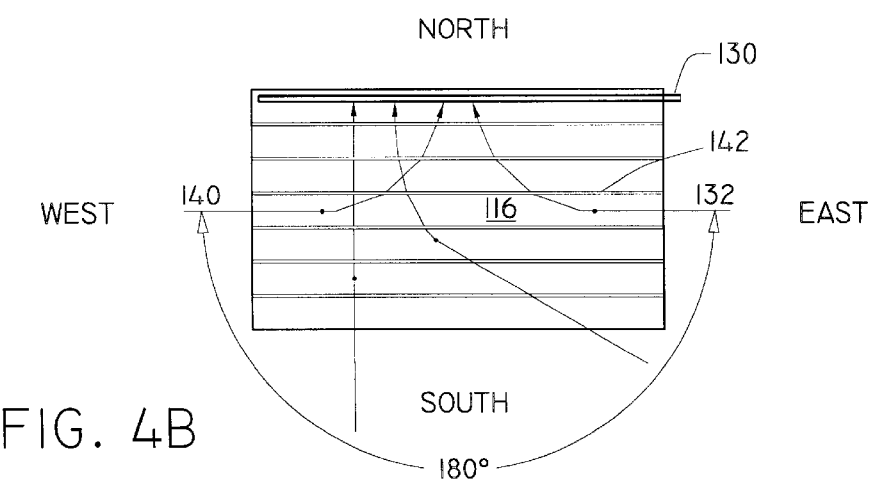
FIG. 4B is a plan view of the lightguide in FIG. 4A.

FIG. 4B is a simplified plan view of the same nontracking collector showing the guided paths of extreme off axis rays 132 and 140. Rays are turned toward receiver 130 incrementally by each encounter with a bottom diagonal wall 116 and directional panel 142. The full altitude/azimuth field of view of 90°/180° delivers up to 12 hours (6 am to 6 pm) of solar collection and concentration.

SUMMARY

The reader has been shown a new solar concentrating collector with striking properties: (1) the low-profile optic can be filled with water, (2) with water, the collector can be made large, (3) expensive sun-tracking equipment is not needed, (4) the concentration ratio is relatively high, and (5) construction is straightforward. In the emerging field of renewable energy, there is a pressing need for a cost-effective solar concentrator. This nonpolluting engine can be put to work on a large scale in the purification of water, the generation of electricity, process steam, refrigeration and the production of hydrogen.

Although preferred embodiments have been treated in detail, it should be understood that reasonable variations and modifications are possible without departing from the spirit and scope of the invention.

What is claimed is:

1. A nontracking solar concentrator comprising:
   a. a low-profile tank,
   b. a volume of liquid to fill said tank,
   c. a plurality of optical panels for the collection, transmission and concentration of sunlight, said optical panels standing in parallel rows and extending substantially from one end of the tank to the opposite end of the tank, said optical panels being submerged in said liquid,
   d. a receiver for the acceptance and conversion of concentrated light.

2. The nontracking solar concentrator of claim 1 wherein said liquid is demineralized water.

3. A stationary solar concentrating collector comprising a low-profile tank, said tank substantially filled with clear water, said tank also containing a plurality of long optical panels in parallel formation for the collection, transmission and concentration of sunlight, said optical panels being submerged in said water and oriented generally perpendicular to the surface of said water, the tank also containing a long hollow receiver for the acceptance of concentrated sunlight and the acceptance of said water, said receiver being submerged in said water and disposed at one end of the tank, whereby the optical panels collect and concentrate the light while the water guides the light toward the receiver, wherein the water also flows toward the receiver, the water absorbing about half of the concentrated light and arriving at the receiver in a preheated condition, the water then entering the receiver and being elevated in temperature again by the other half of the concentrated light that shines upon the receiver.

4. The stationary solar concentrating collector of claim 3 wherein said receiver is a metal pipe having a circular wall defining an interior space, said wall having a plurality of holes therethrough to allow said water to flow into said interior space.

* * * * *